United States Patent [19]

Yamada

[11] Patent Number: 5,198,256
[45] Date of Patent: Mar. 30, 1993

[54] PROCESS FOR PRODUCING FISH PASTE PRODUCT AND COLORING NOZZLE FOR USE IN THIS PROCESS

[75] Inventor: Kazuo Yamada, Cary, N.C.

[73] Assignee: Kabushikikaisha Kibun, Tokyo, Japan

[21] Appl. No.: 741,619

[22] Filed: Aug. 7, 1991

[30] Foreign Application Priority Data

Oct. 30, 1990 [JP] Japan ................ 2-293241

[51] Int. Cl.$^5$ .................. A23L 1/325; A23P 1/00
[52] U.S. Cl. .................. 426/250; 426/383; 426/540; 426/513; 426/643; 426/802; 425/131.1; 425/462
[58] Field of Search .......... 426/92, 104, 250, 540, 426/643, 514, 513, 517, 383; 425/131.1, 462

[56] References Cited

U.S. PATENT DOCUMENTS

| | | | |
|---|---|---|---|
| 4,362,752 | 12/1982 | Sugino et al. | 426/512 |
| 4,557,940 | 12/1985 | Suzuki | 426/513 |
| 4,746,525 | 5/1988 | Goto et al. | 426/383 |
| 4,824,687 | 4/1989 | Yasuno | 426/92 |
| 4,900,570 | 2/1990 | Matsubara | 426/513 |
| 4,992,286 | 2/1991 | Goto et al. | 426/383 |
| 5,053,242 | 10/1991 | Goto et al. | 426/513 |

FOREIGN PATENT DOCUMENTS

| | | |
|---|---|---|
| 0161857 | 11/1985 | European Pat. Off. . |
| 918588 | 2/1963 | United Kingdom . |
| 1077334 | 7/1967 | United Kingdom . |
| 2108363 | 5/1983 | United Kingdom . |
| 0288120 | 10/1988 | United Kingdom . |

*Primary Examiner*—Jeanette Hunter
*Attorney, Agent, or Firm*—Wenderoth, Lind & Ponack

[57] ABSTRACT

A process for producing a fish paste product, for example, fish paste made to look like crab meat, having the steps of forming a fish paste material into a sheet, cutting the sheet into fibers or strips extending in the longitudinal direction of the sheet, winding the sheet into a rod-like shape, and cutting the material with the rod-like shape to a predetermined length. The surface of the sheet is coated with a dye over a predetermined width, and the sheet cut into fibers or strips is wound in such a way that the colored surface portion forms the outer surface of the material with the rod-like shape. Also disclosed is a coloring nozzle which is suitable for use in the process for producing the fish paste product.

5 Claims, 4 Drawing Sheets

PROCESS FOR PRODUCING FISH PASTE PRODUCT AND COLORING NOZZLE FOR USE IN THIS PROCESS

BACKGROUND OF THE INVENTION

1. Filed of the Invention

The present invention relates to a process for producing a fish paste product, for example, fish paste made to look like crab meat, and also pertains to a coloring nozzle which is suitable for use in this process.

2. Description of the Prior Art

Fish paste made to look like crab meat is generally produced by the following process:

A paste material is formed into a sheet through a forming nozzle having a long and narrow slit-shaped outlet. The sheet has cuts made in one surface to divide the material along the surface into fibers or strips extending in the longitudinal direction of the material. The thus cut sheet is wound or rolled into a rod-like shape, and this rod-like shape has a film having a dye coated on the inner surface thereof wound therearound. In this state, the rod-like shape is passed through a heater to transfer the dye to the surface of the rod-like shape. Thereafter, the rod-like shape is cut to a predetermined length and then packaged as fish paste (for example, see Japanese Patent Public Disclosure (KOKAI) No. 58-29065).

The above-described conventional process suffers, however, from the following problems:

To color the paste material, the prior art necessitates a complicated operation in which a dye is coated on the inner surface of a film and this film is wound around the rod-shaped material. Accordingly, the device required for this operation becomes complicated.

In this regard, there has been another prior art method in which the rod-shaped material is sprayed with a dye for coloring it (see Japanese Patent Public Disclosure (KOKAI) No. 55-124476).

However, this method creates a problem in that the sprayed dye splashes about.

SUMMARY OF THE INVENTION

It is the object of the present invention to provide a process for producing a fish paste product which is free from the above-described problems of the prior art.

Another object of the present invention is to provide a coloring nozzle which is suitable for use in the process for producing a fish paste product.

To these ends, the present invention provides a process for producing a fish paste product, comprising the steps of: forming a fish paste material into a sheet; cutting or scoring one surface of the sheet to divide the material along that surface into fibers or strips which extend in the longitudinal direction of the material; winding or rolling the sheet into a rod-like shape such that the fibers extend in the axial direction of the rod-like shape; and cutting the rod material to a predetermined length.

The process further includes the step of coating a predetermined width of the surface of the sheet with a dye; and, in said winding or rolling step said sheet is wound or rolled such that said dye coating forms at least a part of the outer surface of the material with said rod-like material.

In addition, the present invention provides a coloring nozzle, which is mounted at an outlet of a forming nozzle, for extruding a material to form it into a sheet; the coloring nozzle having an outlet which opens at a position where the material extruded from the forming nozzle passes, such that the surface of the material comes into contact with the outlet; the coloring nozzle being arranged to discharge a dye from the outlet to color at least a part of the width of the material surface.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DETAILED DESCRIPTION OF THE PREFERRED EMBODIMENTS

The present invention will be described below in detail by way of embodiments and with reference to the accompanying drawings.

Figure 1:
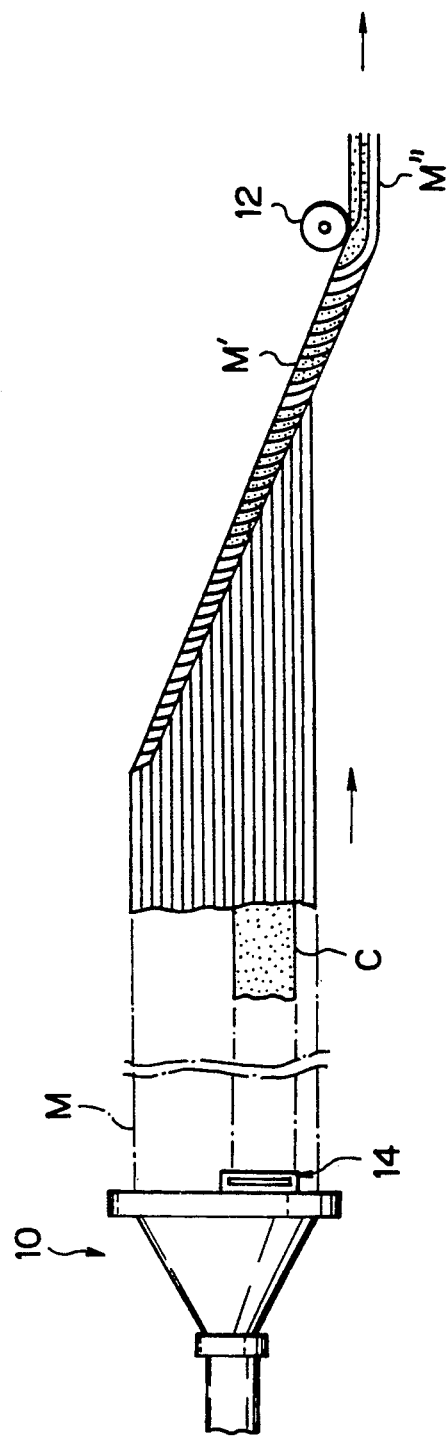
FIG. 1 is a plan view of an essential part of an apparatus according to one embodiment of the present invention.

FIG. 1 is a plan view of an essential part of an apparatus for producing a fish paste product made to look like crab meat, to which the present invention is applied.

In this apparatus, as disclosed, for example, in Japanese Patent Post-Examination Publication No. 01-45350 (1989), a fish paste product is extruded through a forming nozzle 10 to form a sheet M, which is then passed through a scorer (not shown) to form cuts in one surface to divide the material of the surface into fibers or strips extending in the longitudinal direction, i.e. the direction of extrusion, of the sheet M. The sheet M thus scored is diagonally wound or rolled obliquely to the direction of extrusion from one edge (the upper edge as viewed in FIG. 1) with the one surface on the inside, and that rolled up material M' is engaged with a rotating roll 12 which is set at a position sideward (downward as viewed in FIG. 1) from an extension of the sheet M. Then, the material M' is pulled in a direction substantially parallel to the direction of extrusion of sheet M, thereby forming the material M' into a rolled up rod-like shape, i.e., a shape like that of a rod material M" having the rod-like shape is cut by a cutter (not shown) into a predetermined lengths and is then packaged, fish paste.

In the prior art, after the fish paste material has ben formed into a rod-like shape, the peripheral surface of the material is colored, as has been described above.

In contrast, in the illustrated embodiment of the present invention, the sheet M is discharged from the outlet of the forming nozzle 10 and then immediately colored or wetted with dye, as shown by C, at the nozzle outlet, as described below.

In the present invention, a coloring nozzle 14 is provided at the outlet of the forming nozzle 10. The coloring nozzle 14 is adapted to color only a predetermined width of the surface of the sheet M on the opposite side from the cut or scored side (i.e., only the portion which forms the outer surface of the material M" having the rod-like shape when the sheet M is formed into a rod-like shape). When the sheet M is diagonally wound or rolled, each fiber or strip is wound in a spiral form, but when the wound material M' is pulled in the shape of a rod over the roll 12, the fibers or strips become straight and extend along the rod. Accordingly, if the surfaces of the straight fibers or strips that appear on the surface of the material M" are colored, color is eventually given to the entire outer surface of the resulting material M" having the rod-like shape.

Figure 2:
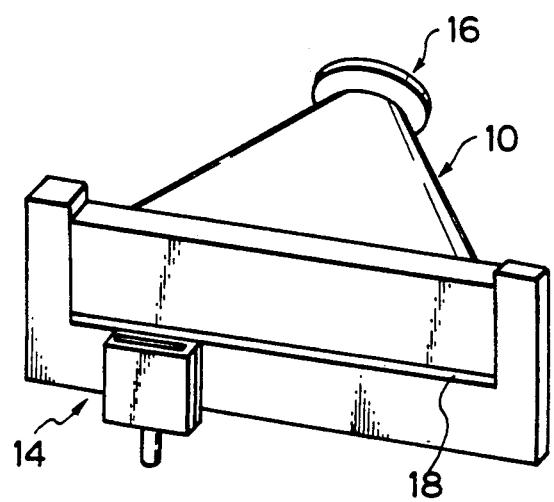
FIG. 2 is a perspective view of a forming nozzle and a coloring nozzle used in the apparatus shown in FIG. 1.
Figure 3:
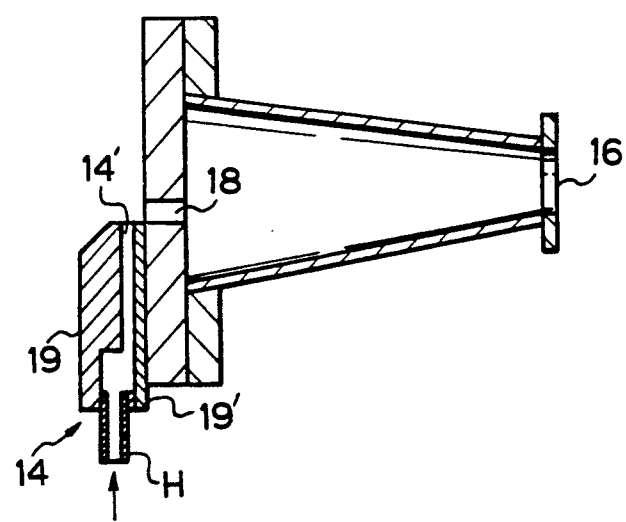
FIG. 3 is a sectional elevational view of the forming nozzle and the coloring nozzle.

FIGS. 2 and 3 show the forming nozzle 10 and the coloring nozzle 14 in the above-described apparatus.

The forming nozzle 10 has a configuration that diverges from a material inlet 16 toward a slit-shaped outlet 18, i.e. an outlet in the shape of a slit. The coloring nozzle 14 is set below the outlet 18 of the forming nozzle 10. As shown in FIG. 3, the coloring nozzle 14 comprises two plate-shaped members, namely front and rear plates 19 and 19', which are superposed and define a nozzle bore 14' therebetween. A hose H for supplying a dye is attached by insertion into an opening that is formed in the nozzle 14 which is closer to the bottom of the plate-shaped members. Preferably, the coloring nozzle 14 is removably mounted by use of appropriate fasteners, for example, bolts. As to the dye, it is preferable from the viewpoint of the adhesion to the material of the extended sheet to employ a mixture of a dye and minced fish meat, which is formed by stirring a desired dye into minced fish meat formed very loosely.

Figure 4:
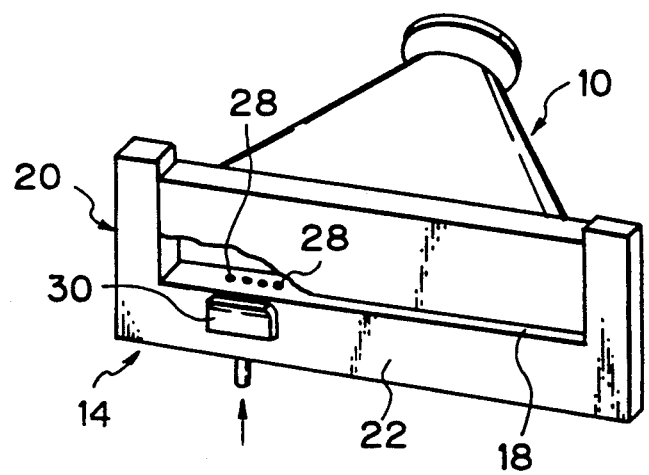
FIG. 4 is a perspective of view of a forming a nozzle and a coloring nozzle according to another embodiment of the present invention.
Figure 5:
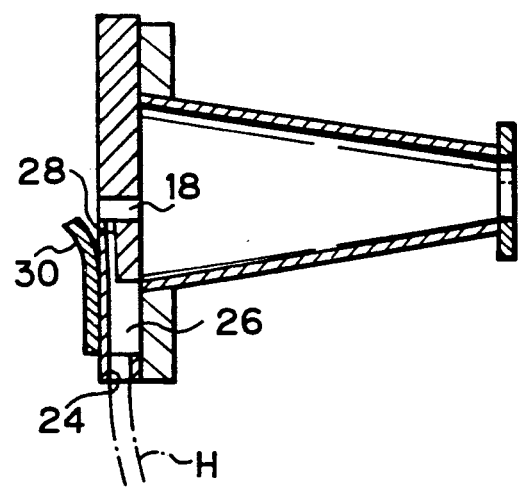
FIG. 5 is a sectional elevation view of the forming nozzle and the coloring nozzle shown in FIG. 4.

FIGS. 4 and 5 show a forming nozzle and a coloring nozzle according to another embodiment of the present invention.

In this embodiment, a coloring nozzle 14' is formed inside a lower portion 22 of a plate-shaped member 20 that defines one edge of the outlet 18 of the forming nozzle 10. As will be clear from the figures, the bottom of the lower portion 22 is provided with an opening 24 for receiving the dye supply hose H. In addition, the lower portion 22 is provided with a dye storage chamber 26 that is communicated with the opening 24, and a plurality of nozzle bores 28 extend from the storage chamber 26 to the top of the lower portion 22 of plate-shaped member 20 containing the chamber 26. Further, a dye spreading plate 30 is attached to the front surface of the lower portion 22 of the outlet defining plate-shaped member 20 to spread the dye sprayed on the lower surface of the sheet M from the plurality of nozzle bores 28.

Figure 6:
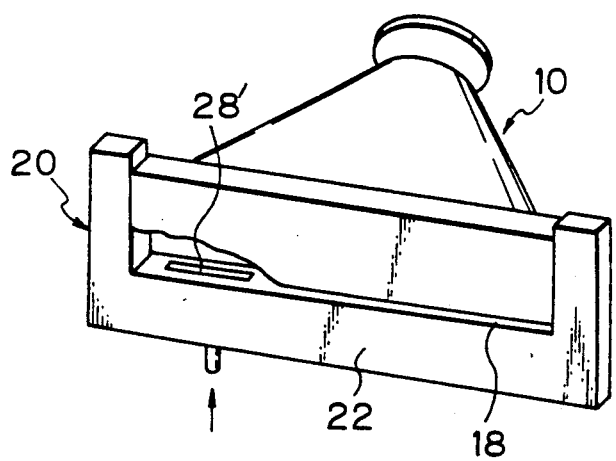
FIG. 6 is a perspective of view of a forming a nozzle and a coloring nozzle according to the third embodiment of the present invention; and, FIG. 7 is a sectional elevation view of the forming nozzle and the coloring nozzle of FIG. 6.
Figure 7:
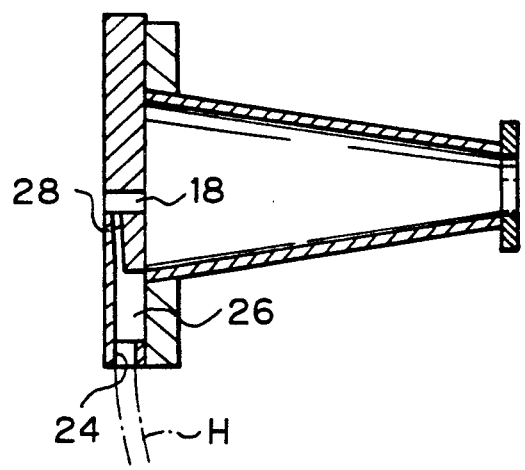

FIGS. 6 and 7 show a forming nozzle and coloring nozzle according to the third embodiment of the preset invention.

The forming nozzle and coloring nozzle of this embodiment has the same construction as that of the second embodiment shown in FIGS. 4 and 5 except that the nozzle bore 28' is a slit and the spreading plate 30 required in the second embodiment is therefore not provided.

According to the present invention, to color the surface of a product which is finally formed into a rod-like shape, the material is colored while it is in the shape of a sheet, in contrast to the prior art wherein the material is colored after being formed into a rod-like shape. Therefore, the coloring operation is facilitated, so that the device for performing the coloring operation can be simplified.

Although in the foregoing embodiments the sheet is wound or rolled obliquely from one side to the other to form a material having a rod-like shape, it will be apparent that the present invention is also applicable to a process wherein the sheet is obliquely wound or rolled from both sides to form a rod-shaped material as a whole, for example.

Although the present invention has been described in specific terms, it should be noted here that the described embodiments are not necessarily exclusive and that various changes and modifications may be imparted thereto without departing from the scope of the invention which is limited solely by the appended claims.

What is claimed is:

1. In a method of producing a fish paste product having the steps of: forming a fish paste material into an elongated sheet having opposite sides; scoring at least one of said opposite sides of the sheet with parallel cuts in the direction of elongation of said sheet so as to define a plurality of fiber-shaped portions in the sheet between said parallel cuts; winding the scored sheet into a rod-like shape material with the fiber-shaped portions extending in the axial direction of the rod-like shape material; and cutting the rod-like shape material into predetermined lengths; the improvement comprising:

a step of, prior to said winding step, applying a dye to one of said opposite sides of said sheet along the length, thereof and in a predetermined width to form a dyed portion; and in carrying out the winding of said scoring sheet, placing said dyed portion of the side of the sheet to which the dye has been applied on the outside of the rod-like shape material.

2. The improvement as claimed in claim 1 in which the step of forming the fish paste material into a sheet comprises providing a nozzle having a long narrow discharge outlet and extruding the fish paste material through said discharge outlet, said improvement further comprising, for carrying out the step of applying a dye, providing a dye application nozzle along a side of said long narrow discharge outlet and forcing a dye through said dye application nozzle against one side of the fish paste material being extruded through said discharge outlet.

3. A nozzle for forming a sheet of fish paste material having a dye applied to one side thereof, comprising a nozzle body having a long narrow discharge outlet, and a dye application nozzle at a side of said long narrow discharge outlet for directing dye against a side of a paste material being extruded through said long narrow discharge opening and the surface of which sheet side is shaped by said side of said long narrow discharge opening.

4. A nozzle as claimed in claim 3 in which said dye application nozzle is mounted on said nozzle body just outside said long narrow discharge opening.

5. A nozzle as claimed in claim 3 in which said dye application nozzle is incorporated in a portion of said nozzle body along a side of said long narrow discharge opening.

* * * * *